E. A. STIER & R. C. BYRD.
PORTABLE STEAM VULCANIZER.
APPLICATION FILED JULY 11, 1911.
1,026,229.
Patented May 14, 1912.
2 SHEETS—SHEET 1.
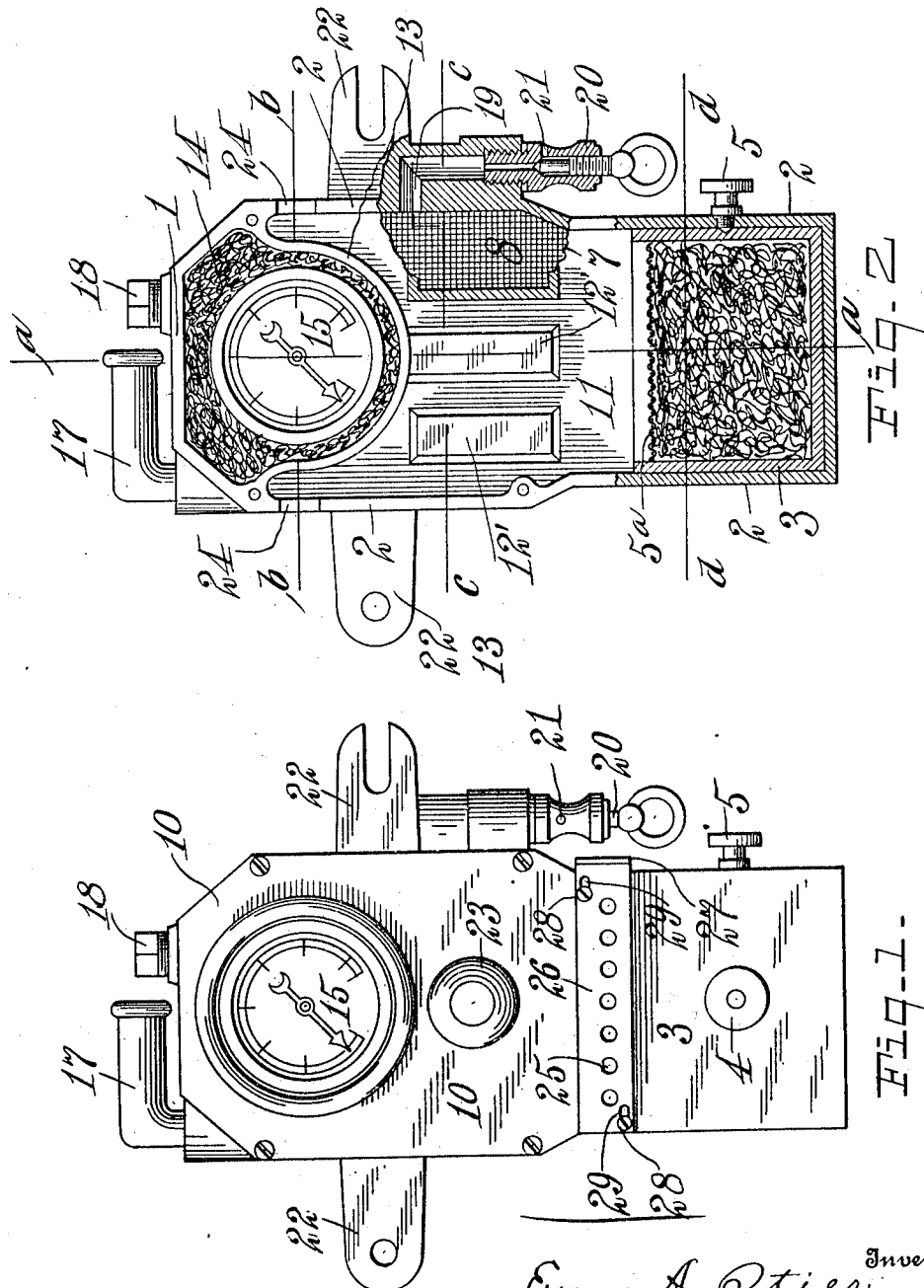
Witnesses
Inventors
Eugene A. Stier
and
Ralph C. Byrd.
By R. J. McCarty
Their Attorney

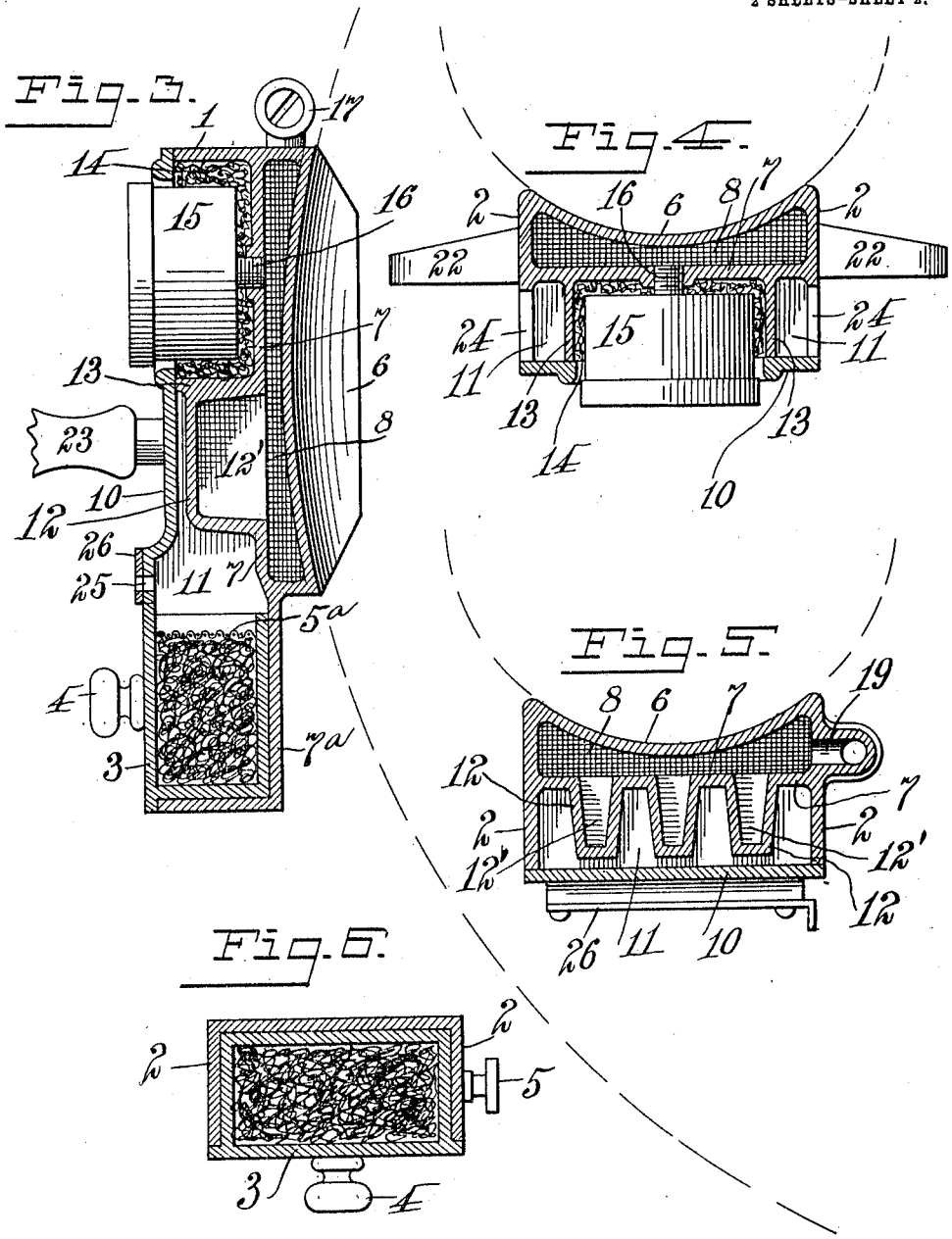

UNITED STATES PATENT OFFICE.

EUGENE A. STIER AND RALPH C. BYRD, OF DAYTON, OHIO.

PORTABLE STEAM-VULCANIZER.

1,026,229.

Specification of Letters Patent.

Patented May 14, 1912.

Application filed July 11, 1911. Serial No. 637,866.

*To all whom it may concern:*

Be it known that we, EUGENE A. STIER and RALPH C. BYRD, citizens of the United States, residing at Dayton, in the county of Montgomery and State of Ohio, have invented certain new and useful Improvements in Portable Steam-Vulcanizers; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in portable vulcanizers for repairing pneumatic tires.

The object of the invention is to provide a compact and efficient device of this type, the various details and advantages of which will be fully described in the following specification, and particularly pointed out in the claims. In carrying out this object it has been the aim to provide for the location of the steam pressure gage at a convenient place in the vulcanizer where it is protected from striking against anything in manipulating the vulcanizer, and to protect said gage also from the heat generated within the vulcanizer. Another feature to which it is desired to call attention is the vulcanizing surface, this is so shaped as to conform to the contour of the tire to be mended, both lengthwise and transverse.

Referring to the accompanying drawings, Figure 1 is a front elevation of the device. Fig. 2 is a similar view with the front plate removed and parts appearing in section. Fig. 3 is a section on the line *a—a* of Fig. 2. The dotted curve indicates the position of the tire relative to the device. Fig. 4 is a section on the line *b—b* of Fig. 2. The dotted curve indicates the position of the tire. Fig. 5 is a section on the line *c—c* of Fig. 2; and Fig. 6 is a section on the line *d—d* of Fig. 2.

Throughout the specification and drawings, similar reference characters indicate corresponding parts.

Referring more particularly to the drawings, it will be seen that the body of the vulcanizer is cast in one integral part.

1 represents the top, and 2—2 the side walls which are contracted at their lower portions to form the sides of a pocket which receives a burner 3. This burner is provided with a handle 4, and held in position within the pocket by a thumb screw 5. The interior of said burner is filled with mineral wool, waste asbestos or the like, which is held in position from above by a wire screen 5ª. The upper front portion of the device is provided with a wall 6 which is rounded lengthwise and transversely to receive the tire to be repaired. This is the vulcanizing surface. The dotted curved line in Fig. 3 indicates the position of the tire against the lengthwise curve of the vulcanizer, while the dotted curves in Figs. 4 and 5 indicate the position of the tire against the transverse curvature of the vulcanizing surface 6. Both curvatures of the tire being thus embraced, the manipulation of the vulcanizer is greatly facilitated. The manner of using this type of hand vulcanizer is well understood and requires no further description.

In the rear of the vulcanizing wall 6 and extending from the top 1 and the inner sides of the walls 2, is a wall 7, which, together with the vulcanizing wall 6, forms the steam chamber 8 for heating said vulcanizing wall. A curved wall 13 joins the rear side of the intermediate wall 7 and provides a pocket for the reception of a steam-pressure gage 15 which faces the operator as he manipulates the implement. Surrounding the steam gage within the pocket is a supply of suitable heat-insulating material such as crude asbestos. The side walls 2 are provided with openings 24 adjacent to the points where the curved wall 13 joins the front and side walls. These openings provide an outlet for the heat generated within the device. The heat is deflected by the curved wall 13 to these openings and thus the pocket in which the steam gage is located, is relieved of an accumulation of heat. This, in addition to the surrounding wall 13, provides efficient means for protecting the gage from an excessive heat. Also extending from the rear side of the wall 7 are a series of walls 12 which lie below the curved wall 13 and provide a series of steam pockets 12' which communicate with the steam chamber 8. These steam pockets, it will be observed, are in the combustion chamber 11 and are heated therefrom, the wall 13 concealing the gage from the top of the combustion chamber with the steam pockets interposed between the burner and said wall. The steam gage communicates with the steam chamber 6 through a short tube 16. Below the pockets 12' the wall structure 7 unites in forming the lower front wall 7ᵃ of the vulcanizer. The rear side of the vulcanizer is closed by a face plate 10, which has an opening through which the gage face extends. Thus plate 10 engages the pocket wall 13 and thus seals the gage pocket from the combustion chamber 11.

It will be seen in Fig. 3, that the face plate 10 engages snugly the surrounding edge of the wall extension 13, so that the flame of the combustion chamber is excluded from the insulated gage pocket 14. The sides 2 of the body of the vulcanizer are provided with orifices 24 on each side of the gage. These openings form outlets for the products of combustion from the burner chamber, and prevent their accumulation at the gage. The steam chamber 8 is provided with a safety pressure valve 17 which prevents the pressure of the steam rising to unsafe limits. The safety tube 17 lies parallel with, and close to the top of the vulcanizer, so that it does not encumber the free manipulation of the implement. The water, from which the steam is generated, is introduced into the chamber 8 through an opening in the top 1, said opening being normally closed by a plug 18. The chamber 8 is supplied with water to a depth approximately in line with the top of the pockets 12. To ascertain this point when filling the chamber, one of the side walls 2 is provided with an opening 19 at the proper level, which is controlled by a valve 20 having a lateral discharge orifice 21. This valve 20 is opened when the water is placed in the chamber 7, and when the water flows out of the discharge opening 21, it indicates that sufficient water has been placed in the steam chamber.

Extending from the side walls 2 are projections 22 by means of which the vulcanizer may be secured to the tire. The vulcanizer may be carried by a handle 23 extending from the cover plate 10. The cover plate 10 is further provided with a series of openings 25 which are controlled by a slidable damper 26. The manipulation of this damper allows air to enter the burner chamber 11, as may be desired. An end of the perforated slide 26 is turned up to provide a finger piece 27 by which it is manipulated, guide screws 28 holding it in position, and slots 29 permitting its movement. When the burner is inserted in the pocket at the bottom of the vulcanizer, the products of combustion pass through the burner chamber 11 around the pockets 12 and out through the orifices 24. When the steam in the chamber 8 reaches a sufficient temperature, indicated by the pressure thereof at the gage, the damper openings 25 are placed in communication with the atmosphere, thus allowing sufficient air to enter the chamber 11 to prevent the temperature of the steam rising above the vulcanizing point.

It will be seen that a portable steam vulcanizer as thus constructed, is compact and simple in construction as well as efficient in operation. The steam gage is in convenient sight of the operator. It is so pocketed and surrounded by an insulation that the damaging effect of the heat of the furnace is reduced to a minimum. This is important in so small and compact a device as a hand vulcanizer.

Having described our invention, we claim:

1. A vulcanizer comprising a casing having a vulcanizing surface, an inner wall parallel with said vulcanizing surface, joining the side walls and providing a steam chamber for said vulcanizing surface, said inner wall being extended laterally and annularly from said steam chamber to provide a steam gage pocket, the upward terminals of said annular wall uniting with the side walls, and the rearward terminal of said laterally extended portion being extended downwardly and thence laterally and uniting with the front wall of the combustion chamber, and providing a series of steam pockets above the combustion chamber, the side walls being provided with openings on each side of the annular wall, which form outlets for the products of combustion, and whereby a storage of heat around said gage pocket is prevented, and a face plate forming the rear closure for the combustion chamber and having an opening in its upper portion, which coincides substantially with the circumference of the gage pocket.

2. In a hand manipulative vulcanizer, a casing, a vulcanizing wall supported on said casing, said wall being curved lengthwise and transversely whereby the entire surface thereof is adapted to engage the tire to be repaired, an inner wall forming a steam chamber against said vulcanizing wall, said inner wall joining the vulcanizing wall below said steam chamber, a series of steam pockets in said combustion chamber joined to said inner wall, an annular wall joined to said inner wall above the combustion chamber and providing a pocket for a steam gage, a pipe opening between said pocket and the steam chamber, and a face plate inclosing the combustion chamber and engaging the annular wall of the gage pocket at the rear of the vulcanizer, substantially as described.

3. A portable vulcanizer of the character specified, comprising a front wall providing a vulcanizing surface, and top and side walls united to said front wall, an inner wall extending from the top parallel with the front vulcanizing wall and providing a steam chamber thereat, said inner wall having a rearwardly extended and annularly walled pocket for the reception of a steam pressure gage, said inner wall below said pocket having a series of steam pockets lying in the combustion chamber and communicating with the steam chamber, the lower portion of said inner wall being extended to form a burner pocket, substantially as described.

In testimony whereof we affix our signatures, in presence of two witnesses.

EUGENE A. STIER.
RALPH C. BYRD.

Witnesses:
R. J. McCARTY,
MATTHEW SIEBLER.

Copies of this patent may be obtained for five cents each, by addressing the "Commissioner of Patents, Washington, D. C."